July 11, 1933.   D. W. BOWERS   1,918,178
PROCESS OF TREATING SULPHUR BEARING ORES
Filed Jan. 14, 1932
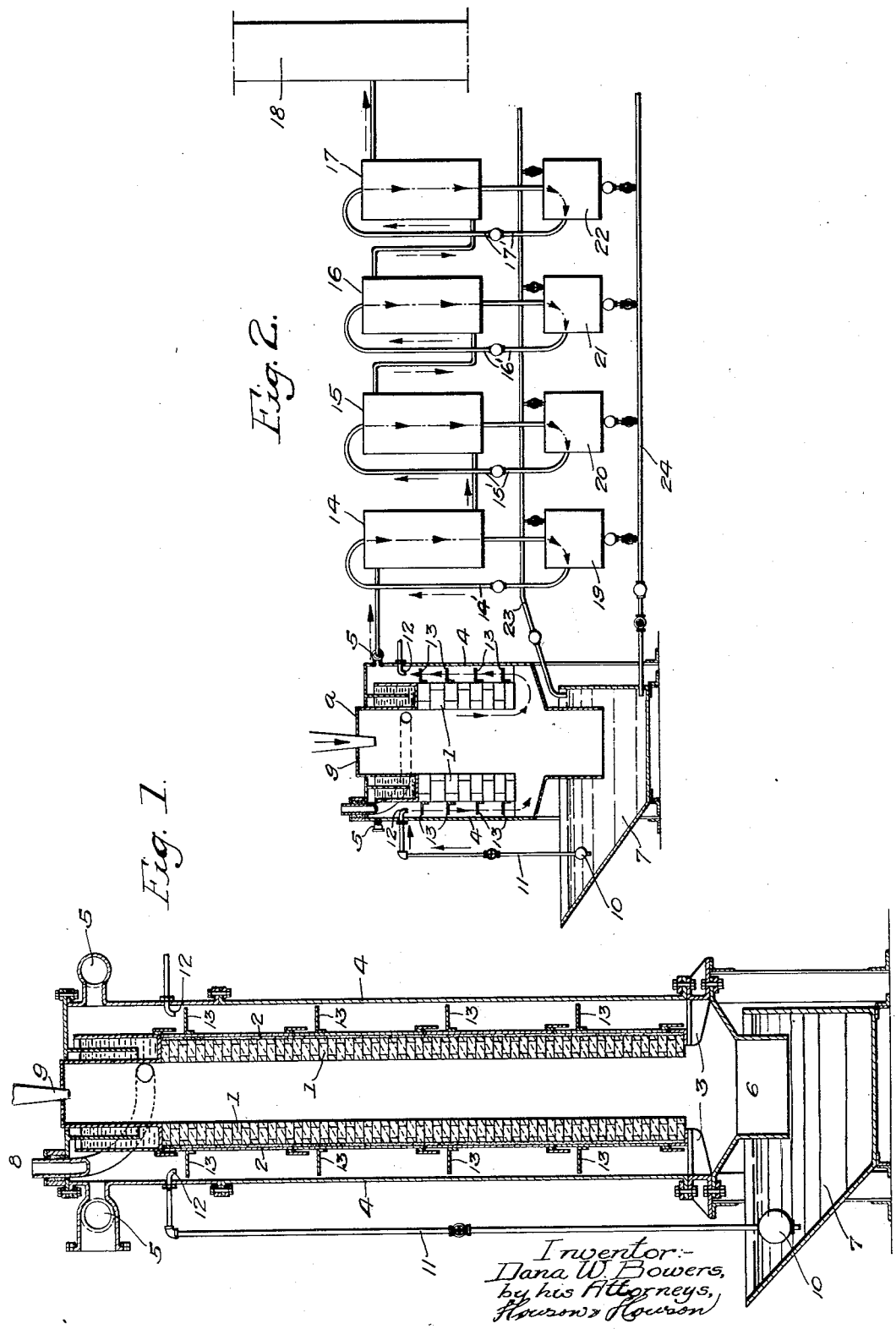

Patented July 11, 1933

1,918,178

UNITED STATES PATENT OFFICE

DANA W. BOWERS, OF PHILADELPHIA, PENNSYLVANIA, ASSIGNOR TO THE ENTERPRISE MANUFACTURING COMPANY, OF PENNSYLVANIA, OF PHILADELPHIA, PENNSYLVANIA, A CORPORATION OF PENNSYLVANIA

PROCESS OF TREATING SULPHUR-BEARING ORES

Application filed January 14, 1932. Serial No. 586,648.

My invention relates to a novel and improved metallurgical process for the treatment of ores, and more particularly, it relates to a process of extracting and recovering the valuable elements and compounds of sulphur-bearing ores.

One object of my invention is to provide a process of treating sulphur-bearing ores irrespective of their relative simplicity or complexity of composition, to recover therefrom a high percentage of the valuable constituents of the ore in an expeditious and economical manner.

Another object of my invention is to furnish a process of flash-roasting sulphur-bearing ores, and of extracting and recovering the valuable products therefrom, which is characterized in part by the subjection of the flash-roasted ore to a combined quenching and gas-scrubbing operation with a liquid medium having a chemical action upon certain constituents of the roasted ore, whereby it is possible to control the nature of the solid material and the solution obtained within the limits afforded by the type of ore roasted.

A further object of my invention is to provide a process of flash-roasting sulphur-bearing ores in which the roasted ore particles are quenched and the gases resulting from the roasting are scrubbed by means of a liquid which is re-circulated through the system, whereby a greater amount of material is rendered soluble than in previous processes and a large saving is afforded in the amount of quenching medium required.

Other objects will be apparent from a consideration of the specification and claims.

The process of the present invention contemplates the flash-roasting of sulphur-bearing ores and the subjection of the hot roasted ore particles in gaseous suspension as they leave the flash-roasting furnace to the action of the reagents contained in liquors re-circulated to and through the gas-scrubbing means through which the ore-laden gases pass. It contemplates the flash-roasting of sulphur-bearing ores and the subsequent quenching and gas-scrubbing of the products of the roasting by means of a reagent-bearing liquid which is re-circulated through the system.

The reagent-bearing re-circulated liquor by this procedure is recontacted with the freshly roasted ore particles as they emerge from the furnace, thereby creating chemical and physical conditions not heretofore possible. Compounds existing in the ore, either in a free state or rendered available by the roasting operation, influence the chemical nature of the re-circulated liquor and modify its action on the ore particles coming in contact therewith. Furthermore, reagents may be added to the raw ore input of the furnace, added to the re-circulated liquor, or to both, in any proportions desired. Thus, it will be seen that the nature of the re-circulated liquor may be modified in accordance with the type of ore treated and with the type of product desired as the result of the flash-roasting process. According to the invention, it is, therefore, possible to control the nature of the solid material and of the solution obtained as a result of the process within the limits afforded by the type of ore roasted.

The quenching liquid employed at the start of the reaction may be chemically free water or it may contain any desired chemical either an acid, an alkali or a salt. In any event, at least a portion of this quenching liquor is re-circulated and used repeatedly as a scrubbing and quenching medium. It is generally preferable to remove some or all of the solid ore particles suspended therein and, when desired, the soluble or colloidal materials may also be removed prior to the re-circulation. The flash-roasting of the sulphur-bearing ores results in the production of sulphur dioxide and/or sulphur trioxide as well as other gases. When these oxides of sulphur come into contact with the quenching liquor, they are absorbed thereby, either forming sulphurous or sulphuric acid or the normal or acid sulphites or sulphates. Due to the presence of the excess sulphur dioxide or trioxide, the acid sulphates are generally found in the solution, the oxides of sulphur reacting with the normal salts to form the acid salts. When no oxidizing compound is included in the roast, the re-circulating liquor for the most part contains sulphurous acid and the acid sulphites, although these compounds are oxidized to a considerable extent to acid sulphates by contact with the excess air of the gases from the roasting furnace. If, however, oxidizing material is present with the ore in the flash-roasting step, the quenching liquor may be composed largely of sulphuric acid and the acid sulphates, the amount of these compounds being increased in proportion to the oxidizing effect of the said reagent upon the roasted ore and the sulphur content thereof.

By the present invention, the quenching liquor in each circulation is supplied and replenished with sulphurous and/or sulphuric acid, due to the further absorption of the sulphur dioxide and/or trioxide contained in the gases, thus building up a solution of acid salts of the ore constituents. I have found that the acid salts have a remarkably strong solvent action on certain of the ore constituents. The presence of the acid salts in solution also allows the maintenance of higher temperatures in the quenching liquor than is possible when the acid is the only constituent of the liquor. This increase in temperature enhances the solvent action without an accompanying loss of water by evaporation. In fact, the evaporation is markedly retarded by the high boiling point of the solution. Furthermore, if alkalis such as sodium hydroxide or sodium carbonate or bicarbonate are present either by reason of their addition to the roast or to the quenching liquor, it is possible by means of the re-circulation to build up very high concentrations of the acid salts in the liquor due to their high solubility, in which case the solvent action of the re-circulated liquor is increased.

These factors all contribute to give a quenching medium which has a remarkably high solvent power on the roasted ore particles, and by the use of the re-circulation of the quenching medium, larger amounts of valuable materials are rendered soluble without the necessity for the addition of commercial sulphuric acid. In certain instances, however, such as in the flash-roasting of galena, the main product to be recovered is lead in the form of its compounds which are for the most part insoluble in the quenching medium. In this case, the high solvent power of the quenching liquor frees the lead compounds from the contaminating copper, zinc and iron compounds which are rendered soluble and are found in the solution from which they can be recovered if desired.

Other advantages of the re-circulation feature reside in the fact that the high acidity maintained thereby, flocculates the sediment, thus causing rapid settling of the suspended solid matter and that the high concentration of salts in the liquor facilitates the recovery thereof by evaporation of the liquor. A further important feature of the re-circulation of the quenching and scrubbing liquor is that new water need be added only in amounts necessary to compensate for that lost by evaporation and as moisture removed with the sludge, in contradistinction to the enormous amount otherwise required and which is difficult to dispose of due to its contamination by the sulphur dioxide and trioxide gases. Furthermore, the use of a large amount of new water adds materially to the cost of operation and presents difficulties in recovery of sulphur dioxide due to the excessive dilution.

The invention also contemplates the use of additional gas scrubbers through which the gases containing such fumes and suspended solids therein as are not removed in the primary scrubber are passed and stripped of these materials. The liquid scrubbing medium employed in these scrubbers may be water, water containing any desired chemical with which the gases or the solid matter, or both, may react, or any other suitable liquid. The fresh material may be employed in the last of the series of scrubbers circulated from the last to the next previous scrubber and so on, counter-current to the flow of the gases and ultimately delivered to the settling tank used in conjunction with the primary scrubber in which the hot ore particles are quenched. In this settling tank, the portion of the suspended solids are deposited and the liquor re-circulated through the primary scrubber as the quenching medium, as hereinbefore described. By this procedure, all solids are stripped from the gases and the temperature in the various scrubbers may be maintained as desired to control the amount of gases absorbed. By maintaining the temperatures near the boiling point throughout the gas-scrubbing system, the retention of the gases in the scrubbing liquid is reduced to a small percentage, except for the desired amount absorbed and removed by the acid salts in the primary scrubber. The sulphur dioxide gas evolved from the flash-roasting as herein described and not absorbed in the scrubbing liquor may be recovered in a very pure condition, free from solids and particularly suited for liquefaction, for the production of bisulphite liquor or the manufacture of sulphuric acid of high purity.

Various ores may be used in the present process, and I have termed these ores "sulphur-bearing ores" by which term I include not only the ores whose metallic elements are associated with sulphur but also any oxide, carbonate or other ore which may be successfully treated by this process when mixed (prior to roasting) with sulphur or a sulphide. Typical mixtures may be azurite and sulphur, franklinite and pyrite, and the like, in proportions which will insure satisfactory roasting and a sufficient acid solvent in the quenching liquor to dissolve the desired constituents of the ore rendered soluble by the roasting. It will be obvious also that if a given ore which contains sulphur associated with its metallic elements is insufficient in sulphur to give a satisfactory roast or insufficient acid solvent in the quenching liquor, additional amounts of sulphur in the form of elemental sulphur or sulphides may be added thereto. The sulphide may be either non-ferrous or ferrous, but since the iron oxides produced from ferrous sulphides by the roasting operation are oftentimes difficultly soluble in the re-circulated acid liquors, the use of non-ferrous sulphides is preferred.

The ores are employed in a finely divided condition, for example, sufficiently fine to pass through a one hundred mesh screen. These are brought into the flash-roasting apparatus either in suspension in air or other gas or become suspended in the air or gas as they enter the furnace. Fuel is added to the furnace but when the temperature has reached a predetermined point, say 1000° C., the sulphur and the associated metals furnish sufficient fuel to permit a considerable reduction in the amount of supplemental fuel added to the furnace. The preferred form of supplementary fuel employed is gaseous, although atomized liquid and powdered solid fuel may be employed with success.

The air required for the oxidation of the sulphide ores is approximately proportional to the oxidizable matter present in the ore and in direct relation to the oxygen-combining property of the elements present. In order to insure complete oxidation, an excess of air is usually employed. It is, therefore, impossible to give definite figures for the amount of air required as these can only be determined by the composition of the ore as revealed by an analysis of the sample of the ore to be treated. In a typical case in the treatment of one ton of auriferrous pyrite, approximately 130,000 cubic feet of air is required plus about 20,000 cubic feet of excess air to insure practically complete oxidation of the iron to ferric oxide and sulphur to sulphur dioxide, this being the highest probable requirement in an ore of this type. The amount of fuel employed also is dependent on the type of ore being treated and, therefore, no definite figures can be given, but sufficient fuel is added to the furnace at the start to promote a satisfactory flash-roasting operation, and if necessary, additional amounts of fuel are added during the process to maintain the flash-roasting step progressing satisfactorily.

The type of furnace employed in the process is immaterial so long as the operation of flash-roasting is carried out therein. The finely divided roasted particles together with the gases of combustion including the sulphur dioxide and/or trioxide pass from the furnace directly into a quenching and gas-scrubbing liquid which has been previously used for the same purpose and, therefore, is high in solvent power, due to the presence therein of acid and acid salts, as hereinbefore described. The acidified recirculating quenching water is preferably maintained at from 80° to 90° C. or as near thereto as may be consistent with the proper quenching and scrubbing of the products of the roasting operation, thereby maintaining the highest attainable solvent value in the acid liquor. The quenching liquor, after having come in contact with the hot ore particles and the gases of combustion, is preferably passed to settling tanks or filters to remove a portion or all of the solids therefrom. The supernatant liquor from the settling tanks or the filtrate from the filters is returned to the quenching and gas-scrubbing chamber preferably continuously, water having been added if necessary to maintain the desired volume of quenching water at a satisfactory temperature required to quench and scrub the products of the roasting process.

In treating ores where special conditions are desired, as in the roast, the gases or the quenching liquor, reagents causing these conditions may be added to the ore input in sufficient quantity, say from 1% to 20% to give the desired results. For example, if a chloridizing roast is desired, an alkali chloride such as common salt is employed; similarly, a nitrate salt is used when it is desired to promote a high degree of oxidation of the ore and to increase the formation of sulphur trioxide, thus increasing the sulphuric acid content of the quenching liquor.

In the treatment of lead-zinc ore by a chloridizing roast, the chloride in combination with the lead is largely transient since the acid sulphites and sulphates in the acid quenching liquor cause the formation of lead sulphites and sulphates which are for the most part insoluble in the solution. The zinc, on the other hand, is acted upon both by the chloride and the acid salts, and, therefore, passes into the solution principally as zinc chloride and zinc sulphite. Because of the occurrence of these intermediate reactions, the exact amount of alkali chloride required to be added to the incoming ore must be determined by the condition of the roasted residue desired as well as by the percentage of lead in the ore treated. In the flash-roasting of lead ores where a strong oxidizing condition is maintained, for example, by the addition of a nitrate, the ore is fumed with formation of a mixture of basic lead sulphate, sulphite and carbonate, as when the oxidizing nitrate reagent is omitted. However, when this reagent is employed, with consequent increase of free sulphuric acid in the re-circulating liquor, the lead sulphite and carbonate are converted to basic sulphate, supplementing that initially formed, accompanied by evolution of sulphur dioxide and carbon dioxide. I have found that the above described reactions occur principally in the primary scrubbing liquor and any lead sulphite fume which passes to the secondary scrubbers is preserved as such by the presence of excess sulphur dioxide.

By restricting the primary re-circulated liquor to quenching the hot gases and to gas-scrubbing sufficient only to classify and precipitate the heavier impure fume, the impurities present in the ore treated are thus retained and the resultant sludge removed for retreatment, being added to new ore input, while the fume of sufficient purity is allowed to accompany the effluent gases to secondary scrubbers supplied with dilute sulphuric acid to convert the fumed product substantially to basic sulphate in marketable form.

I have found that ferrous sulphate formed from the iron content of lead ore oxidizes to basic ferric sulphate during the roasting and quenching operation by absorption of oxygen from the excess air and other oxidizing agents, resulting in discoloration of the basic lead sulphate, hence the desirability of classifying the fume product. The purified product is preferably removed by continuous filtration, in the state of moist filter cake, the filtrate being re-circulated to the secondary scrubbers and when fouled, passed to the primary scrubber.

As previously pointed out, when an oxidizing condition is maintained, the sulphuric acid content of the quenching liquor is increased. This process, therefore, furnishes an expedient method of increasing the potency of the quenching liquor as a leaching medium and is of particular advantage in the treatment of ores containing copper and zinc, since these metals readily dissolve in the sulphuric acid formed inherently in the process.

As previously pointed out, any suitable flash-roasting apparatus which is operatively connected to quenching and gas-scrubbing means (the primary scrubber) may be employed in carrying out the process of the present invention.

In the accompanying drawing, Figure 1 shows diagrammatically a suitable apparatus which may be employed if desired. In Figure 1, the cylindrical retort wall of refractory material shown at 1 is preferably enclosed by an outer metallic casing 2 embodying at its lower end a flange 3 by means of which the refractory wall is supported. Surrounding the retort in spaced relation thereto is a cylindrical casing 4 having its upper portion communicating with the gas outlet 5 which is connected to auxiliary scrubbers, if desired. The lower portion of the casing 4 is open as at 6 and is in communication with a settling tank 7 in which a portion of the hot roasted ore particles and other products of combustion are collected after quenching. Air and fuel, for example, oil, is admitted to the top of the flash-roasting furnace at 9, the ore and air inlet 8 to the furnace being arranged in such manner that the ore, air and burning fuel have a whirling or rotating motion within the retort and expand centripetally therein. The finely divided ore suspended in air is admitted through 8 to the retort where the rotating gases cause greater length of travel and consequent greater time contact of the ore particles with the roasting gases throughout the length of the retort. The fuel may be suitably ignited, and after the operation has continued for a short period, the interior of the furnace becomes highly heated which in turn causes the combustion of the incoming fuel without the aid of an independent igniter, with the result that the finely divided ore intermingled with the whirling air during its downward passage through the retort is very highly heated. The temperature of the flash-roasting process is generally in the neighborhood of 1000° C., but this temperature may be regulated by controlling the amount of supplementary fuel added in such manner as to give the most satisfactory roast for the particular ore being treated. For example, when galena is roasted, and it is desired to produce a maximum quantity of white fume collected from the secondary scrubbers, the furnace temperature should not exceed 800° C., since the use of higher temperatures causes discoloration of the lead compounds just formed. A pump 10 may be placed in the settling tank 7 to re-circulate the quenching liquor in the system. The quenching liquor is forced by the pump 10 through pipe line 11 to the spray heads 12 which encircle the retort between the metal wall 2 and the shell 4. Brackets 13 are placed in the annular space between the two walls which causes the gases and suspended matter therein flowing upwardly through the space to become thoroughly mixed with the quenching and gas-scrubbing liquor flowing counter-current thereto. As previously pointed out, this quenching liquor may be in the neighborhood of 80° C. or 90° C. to give the most satisfactory solvent action. The quenching and gas-scrubbing medium is re-circulated through the primary scrubber in amounts sufficient to quench thoroughly the ore particles to reduce properly the temperature of gases issuing from the furnace and to produce the desired classification and precipitation of impure fume in the primary scrubber. The stripping of the fume product in the secondary scrubbers is induced by local re-circulation therein of uncontaminated scrubbing medium. If desired, the reagent-bearing liquor is passed from the settling tank 7 to a supplementary settling tank or to a filter, in order to remove the suspended solids therefrom prior to the re-circulation of the liquor through the quenching and gas-scrubbing means.

In the drawing, Figure 2, I have shown diagrammatically a flow sheet of a system including the flash-roasting furnace and the scrubbers which may be employed if desired. In the drawing, the flash-roasting furnace is shown at $a$ with the cylindrical retort wall 1 and the cylindrical casing 4 in spaced relation thereto. As previously described, the ore is admitted to the top of the flash-roasting furnace at 8 and mingles with the fuel and air admitted at 9, and is roasted in the upper portion of the flash-roasting furnace. The gases of combustion and the roasted ore particles pass down through the furnace and the heavier material is plunged directly into the liquor maintained in settling tank 7. The suspended ore particles and the gases pass through the space between the walls 1 and 4 where they come in contact with the re-circulated spraying water and are cooled and stripped to some extent. The liquor in tank 7 is re-circulated through the system by means of pump 10. The gases after having been quenched and partially scrubbed leave the furnace at 5 and pass to the scrubber 14 and from there to scrubbers 15, 16 and 17, and thence to the stack 18. The scrubbers 14, 15, 16 and 17 are provided with settling tanks 19, 20, 21 and 22. These settling tanks are provided with pipe lines so arranged that in each individual scrubber, the scrubbing liquor may be re-circulated. These pipe lines are shown diagrammatically in the drawing as 14', 15', 16' and 17', each being provided with a pump as indicated. There is also provided a main trunk line 23 by which the scrubbing liquor of the settling tanks 19, 20, 21 and 22 may be pumped to settling tank 7 from each settling tank through short, valved pipe lines. There is also provided a sludge trunk line 24 which connects the settling tanks 19, 20, 21 and 22 with the settling tank 7 and with each other. Each settling tank is provided with a pump and valve. The main trunk line is also so provided. Thus, it is possible to remove the sludge from the whole system as it accumulates.

As shown in the drawing, the scrubbing liquor in scrubbers 15, 16 and 17 is counter-current to the flow of the gases, while in scrubber 14 co-flow circulation is shown. The counter-current flow may be employed in all of the scrubbers, if desired, or any of them can be arranged with co-flow circulation as suits the particular process. In the operation of this system, it is possible to employ various scrubbing liquors which are re-circulated through each scrubber as long as desired, for example, until saturated, and they then can be pumped to the settling tank 7 where they join the main re-circulating liquor. The system may, therefore, be operated in a manner to obtain the desired results, since water alone or water containing various chemicals can be used in the various scrubbers to obtain the desired results.

Referring specifically to the treatment of lead ore, an ore of the following composition containing lead sulphide was treated in the apparatus and with the re-circulated gas scrubbing and quenching medium hereinbefore described: Lead 83.5%, zinc .86%, copper .75%, sulphur 13.16%, gangue .35%, iron .50% with traces of silver and gold. This ore was ground sufficiently fine to pass through a one hundred fifty mesh screen and was flash-roasted in the furnace at approximately 2000° F., using fuel oil of 42° Bé. and excess air. .7 pounds of oil were employed to 5 pounds of ore per minute. After the operation was complete, the resulting sludge analyzed as follows: lead sulphate 25.74%, lead sulphite 24.12%, lead basic carbonate $(PbCO_3)_2$. $Pb(OH)_2$ 42.56% metallic lead 2.21%, lead dioxide 1.19%, gangue .66%, copper hydrate .35%, iron hydrate 2.00%, zinc hydrate .31%, silver and gold nil. This sludge was collected from settling tank 7 and mixed with approximately 13% of caustic lime to 87% sludge on a dry basis and subjected to the action of live steam at atmospheric pressure for one hour, resulting substantially in a mixture of crystallized lead oxide (PbO), hydrated calcium sulphate and calcium carbonate. The lead oxide so formed was then subjected to further treatment for conversion to other lead compounds.

In a typical case, where sodium carbonate was mixed with the lead ore, the conditions were as follows: 300 pounds of ore of the composition just recited sufficiently fine to pass through a 150 mesh sieve were mixed with 145 pounds of sodium carbonate. This mixture was flash-roasted at an average temperature of 1700° F. in an apparatus similar to that described. The mixture of ore and sodium carbonate was passed into the furnace at the rate of 6.35 pounds per minute and the duration of the run was seventy minutes. 7 gallons of fuel oil were employed and 460 gallons of liquid were maintained in the settling tank and re-circulating system. It was found that it was necessary to add 150 gallons of water to compensate for the amount of water evaporated and present as moisture in the effluent gases. Most of the sulphur present in the ore was converted to sodium salts and samples of the re-circulated liquor was taken from the settling tank after each 100 pounds of ore had passed through the furnace. An analysis of the re-circulated liquor showed that at the time the first 100 pounds of ore had passed through the system, the re-circulated liquor in the settling tank contained .33 grams of sulphite and .238 grams of sulphate per 100 cubic centimeters. An analysis taken after the passage of 200 pounds of ore through the furnace showed that the sulphite and sulphate had increased to .446 grams and .776 grams per 100 cubic centimeters. At the end of the run, that is, after 300 pounds of ore had been treated, the re-circulated liquor contained .8 grams of sulphite and 1.832 grams of sulphate per 100 cubic centimeters of solution, thus showing the marked increase of these radicals in the re-circulating liquor. The liquor tested alkaline due to the evolution of part of the sulphur dioxide gas, thus creating excess of sodium carbonate. The gases were passed from the quenching and gas-scrubbing means surrounding the furnace which may be termed a preliminary or primary scrubber to a secondary scrubber, the liquid in which at the end of the run was neutral. The gases, after passing through the secondary scrubber, were then passed through a tertiary scrubber, the liquid in which tested slightly acid. The sodium sulphite and sodium sulphate salts in the re-circulating liquor were normal due to the alkalinity, but a decrease in proportion of sodium carbonate to air renders these salts acid, thus affording a solvent for copper, zinc, etc. The high content of normal salts not only raises the boiling point of quenching and scrubbing liquor, thus permitting a higher temperature in the primary scrubber, but affords the required base for retention of sulphur dioxide as alkali sulphite which in contact with the air is oxidized to sulphate and in the presence of sulphur dioxide becomes acid sulphate. The sodium acid sulphate so formed dissolves the zinc and copper compounds, thus forming the normal sodium zinc and copper sulphates. In this reaction, the resultant solid product is for the most part lead carbonate in extremely fine suspension.

Referring to Figure 2, when lead-sulphur ores are subjected to flash-roasting, the acid sulphites and sulphates resulting from the absorption of the gases in the quenching liquor act as solvents for the zinc, copper, iron, silver and other elements which may constitute impurities in the lead ore. In scrubber 14, the re-circulated liquor may be wash water alone and delivered in settling tank 7 when fouled. In scrubber 15, the re-circulating liquor may be sodium carbonate which when re-acted with the lead sulphite and lead sulphate found in the gas stream in the form of suspended particles produces lead carbonate and sodium sulphate. The scrubbing liquor in scrubber 16 may be wash water only, while in scrubber 17 the re-circulating liquor may be sodium hydroxide in which case lead hydroxide is formed which may be converted to lead oxide when a relatively high temperature is maintained in the settling tank 22. If lead basic carbonate is desired, it may be obtained in settling tank 20 by transferring the lead compounds from settling tank 19 to settling tank 20, provided the re-circulating liquor in pipe line 15' is sodium carbonate solution which is re-circulated and used as a scrubbing medium. If desired, lead sulphate may be obtained in settling tank 22 when excess sulphuric acid is maintained in part or all of the re-circulating system including settling tank 7 and the pipe lines 14', 15', 16' and 17', or the lead sulphate may be obtained in the settling tank 21, using wash water only in scrubber 17 for removal of excess acid. This is collected and returned to the settling tank through the trunk pipe line 23. Lead chromate may be recovered in settling tank 21 when the re-circulating liquor in scrubber 16 contains a suitable amount of sodium or potassium bichromate. In this case, scrubbers 14 and 15 may contain wash water only, scrubber 17 being employed as the stripper. The supernatant liquors from settling tanks 21 and 22 in this case are undesirably contaminated and are discarded rather than being returned to settling tank 7. The preparation of the lead basic chromate may be accelerated by the addition of a small amount of caustic alkali to the re-circulating liquor in scrubber 16. If litharge is desired, the production may be obtained in settling tank 19, using a caustic alkali solution as a re-circulating medium in scrubber 14 and using water as the scrubbing means in scrubbers 15, 16 and 17 to wash the product and simultaneously strip solids from the gases passing through scrubbers 15, 16 and 17. The lead sulphate, sulphite and carbonate, which are in the gas stream, re-act with the sodium hydroxide to form lead hydrate. The lead hydrate is precipitated as litharge when the re-circulating liquor in scrubber 14 is maintained at or near the boiling point. Any litharge which passes over from scrubber 14 is collected in settling tanks 20 and 21 and the litharge is transferred from settling tanks 19, 20 and 21 to settling tank 22 where washing is completed. The supernatant liquors from the various settling tanks are pumped through trunk pipe line 23 to settling tank 7.

From these examples, it will be seen that is is possible by employing a number of scrubbers and by employing desired solutions therein to obtain a multiplicity of reactions and the examples given are merely illustrative.

The examples given above in the flash-roasting of lead ores show the variations that are possible in the results obtained by the present invention, and it is possible by similar manipulations to obtain varied results in the flash-roasting of sulphur-bearing ores of zinc, copper, iron, silver and gold. For example, in the flash-roasting of zinc sulphide, lithopone pigment may be produced. This may be accomplished by employing a calculated quantity of barium acetate in the re-circulated liquor with the simultaneous treatment of the liquor with hydrogen sulphide gas. The zinc oxide fume, resulting from the roasting coming in contact with the solution containing the barium acetate, the hydrogen sulphide, and the sulphuric acid radical developed from the roasting of the sulphide, results in a mixture of precipitated barium sulphate and zinc sulphide (lithopone), the whole treatment from admission of the ore to the furnace to the delivery of the product to the filters being embodied in one operation. In the case sodium carbonate is added to the zinc blende or to the liquor or both, zinc carbonate is precipitated if the solution is maintained alkaline. However, when insufficient sodium carbonate is present, the acid sulphite and sulphate salts and the zinc goes into solution. When sodium hydroxide is added to the re-circulated liquor or is employed as a scrubbing liquor in one of the scrubbers in amounts sufficient to form zinc hydroxide, the zinc is obtained as an insoluble compound. If, however, an excess of sodium hydroxide is employed, the zinc salt is found in the solution.

Referring to the treatment of copper sulphide ores, the acid re-circulating liquor causes the formation of soluble copper sulphite or sulphate, the later compound being increased by the addition of an oxidizing agent such as sodium nitrate to the ore input. If sodium carbonate is employed either with the ore input or with the re-circulating or scrubbing liquor, copper carbonate is formed, while the employment of excess caustic alkali in one of the solutions results in the production of copper oxide. The use of sodium arsenite in solution causes the production of copper arsenite, while the use of lime in excess in suspension in one of the liquors produces Bordeaux mixture.

In treating iron pyrite, if a strong oxidizing condition is maintained in the furnace, for example, by the addition of a nitrate to the ore input, the products consist of ferric oxide which is found in the sludge and ferrous sulphate which is found in the solution. The ferric oxide is in a fine state of division and is, therefore, in an excellent condition for use as a pigment.

If a non-chlorodizing roast is employed in the treatment of sulphur ores containing silver, the silver passes into the solution as sulphite or sulphate and may be recovered therefrom. If sodium chloride is employed with the ore, silver chloride is formed and is retained in the sludge from which it may be recovered by suitable treatment, such as thiosulphate leaching. When the ore is auriferous, the gold is liberated and is found in the sludge with the finely divided iron oxide from which it may be separated by amalgamation with mercury.

The foregoing description illustrates the various ores which may be treated and the widely varying results which may be obtained by employing re-circulating and scrubbing liquors of desired characteristics. The invention is not limited to any specific ore, nor to any specific treatment, and is characterized broadly by the re-circulation of the ore-quenching and reagent-bearing and gas-scrubbing liquors, used in conjunction with flash-roasting of ores.

I claim:

1. The process of treating sulphur-bearing ores which comprises subjecting finely divided sulphur-bearing ore particles to flash-roasting, quenching and at least partially gas-scrubbing the hot flash-roasted products with an aqueous solution, and recirculating said aqueous solution through the system to quench and at least partially gas-scrub additional amounts of flash-roasted products therewith.

2. The process of treating sulphur-bearing ores which comprises subjecting finely divided sulphur-bearing ore particles to flash-roasting, quenching and at least partially gas-scrubbing the hot flash-roasted products with an aqueous solution of a reagent capable of reacting with at least one of the flash-roasted products, and recirculating said aqueous solution through the system to quench and at least partially gas-scrub additional amounts of flash-roasted products therewith.

3. The process of treating sulphur-bearing ores which comprises subjecting finely divided ore particles to flash-roasting, quenching and at least partially gas-scrubbing the hot flash-roasted products with an acidulated aqueous solution, and recirculating said acidulated aqueous solution through the system to quench and at least partially gas-scrub additional amounts of the flash-roasted products therewith.

4. The process of treating sulphur-bearing ores which comprises subjecting finely divided ore particles to flash-roasting, quenching and at least partially gas-scrubbing the hot flash-roasted products with an acidulated aqueous solution containing sulphite radicals, and recirculating said acidulated aqueous solution through the system to quench and at least partially gas-scrub additional amounts of the flash-roasted products therewith.

5. The process of treating sulphur-bearing ores which comprises subjecting finely divided sulphur-bearing ore particles to flash-roasting, thereafter quenching and partially gas-scrubbing the hot flash-roasted products with an aqueous solution, recirculating said aqueous solution through the system to quench and partially gas-scrub additional amounts of flash-roasted products therewith, and further gas-scrubbing the gas stream.

6. The process of treating sulphur-bearing ores which comprises subjecting finely divided sulphur-bearing ore particles to flash-roasting, thereafter quenching and partially gas-scrubbing the hot flash-roasted products with an aqueous solution, recirculating said aqueous solution through the system to quench and partially gas-scrub additional amounts of flash-roasted products therewith, and further gas-scrubbing the gas stream with at least one solution capable of reacting with at least one of the products in the gas stream.

7. The process of treating sulphur-bearing ores which comprises subjecting finely divided sulphur-bearing ore particles to flash-roasting, thereafter quenching and partially gas-scrubbing the hot flash-roasted products with an aqueous solution of a reagent capable of reacting with at least one of the flash-roasted products, recirculating said aqueous solution through the system to quench and partially gas-scrub additional amounts of flash-roasted products therewith, and further gas-scrubbing the gas stream.

8. The process of treating sulphur-bearing ores which comprises subjecting finely divided sulphur-bearing ore particles to flash-roasting, thereafter quenching and partially gas-scrubbing the hot flash-roasted products with an aqueous solution of a reagent capable of reacting with it least one of the flash-roasted products, recirculating said aqueous solution through the system to quench and partially gas-scrub additional amounts of flash-roasted products therewith, and further gas-scrubbing the gas stream with at least one solution capable of reacting with at least one of the products in the gas stream.

9. The process of treating sulphur-bearing ores which comprises subjecting finely divided sulphur-bearing ore particles to flash-roasting, thereafter quenching and partially gas-scrubbing the hot flash-roasted products with an acidulated aqueous solution, recirculating said aqueous solution through the system to quench and partially gas-scrub additional amounts of flash-roasted products therewith, and further gas-scrub the gas stream.

10. The process of treating sulphur-bearing ores which comprises subjecting finely divided sulphur-bearing ore particles to flash-roasting, thereafter quenching and partially gas-scrubbing the hot flash-roasted products with an acidulated aqueous solution, recirculating said aqueous solution through the system to quench and partially gas-scrub additional amounts of flash-roasted products therewith, and further gas-scrubbing the gas stream with at least one solution capable of reacting with at least one of the products in the gas stream.

11. The process of treating sulphur-bearing ores which comprises subjecting finely divided sulphur-bearing ore particles to flash-roasting, thereafter quenching and partially gas-scrubbing the hot flash-roasted products with an acidulated aqueous solution containing sulphite radicals, recirculating said aqueous solution through the system to quench and partially gas-scrub additional amounts of flash-roasted products therewith, and further gas-scrubbing the gas stream.

12. The process of treating sulphur-bearing ores which comprises subjecting finely divided sulphur-bearing ore particles to flash-roasting, thereafter quenching and partially gas-scrubbing the hot flash-roasted products with an acidulated aqueous solution containing sulphite radicals, recirculating said aqueous solution through the system to quench and partially gas-scrub additional amounts of flash-roasted products therewith, and further gas-scrubbing the gas stream with at least one solution capable of reacting with at least one of the products in the gas stream.

13. The process of making litharge which comprises flash-roasting finely divided sulphur-bearing lead ore, quenching and partially gas-scrubbing the hot flash-roasted products with an aqueous solution, recirculating said aqueous solution through the system to quench and partially gas-scrub additional amounts of flash-roasted products therewith, and further gas-scrubbing the gas stream with a solution of an alkali hydroxide maintained near the boiling point whereby litharge is precipitated.

14. The process of making litharge which comprises flash-roasting finely divided sulphur-bearing lead ore, quenching and partially gas-scrubbing the hot flash-roasted products with an acidulated aqueous solution, recirculating said aqueous solution through the system to quench and partially gas-scrub additional amounts of flash-roasted products therewith, and further gas-scrubbing the gas stream with a solution of an alkali hydroxide maintained near the boiling point whereby litharge is precipitated.

15. The process of making litharge which comprises flash-roasting finely divided sulphur-bearing lead ore, quenching and partially gas-scrubbing the hot flash-roasted products with an acidulated aqueous solution containing sulphite radicals, recirculating said acidulated aqueous solution through the system to quench and partially gas-scrub additional amounts of the flash-roasted products therewith, and further gas-scrubbing the gas stream with a solution of an alkali hydroxide maintained near the boiling point whereby litharge is precipitated.

DANA W. BOWERS.